Figures 1, 8:
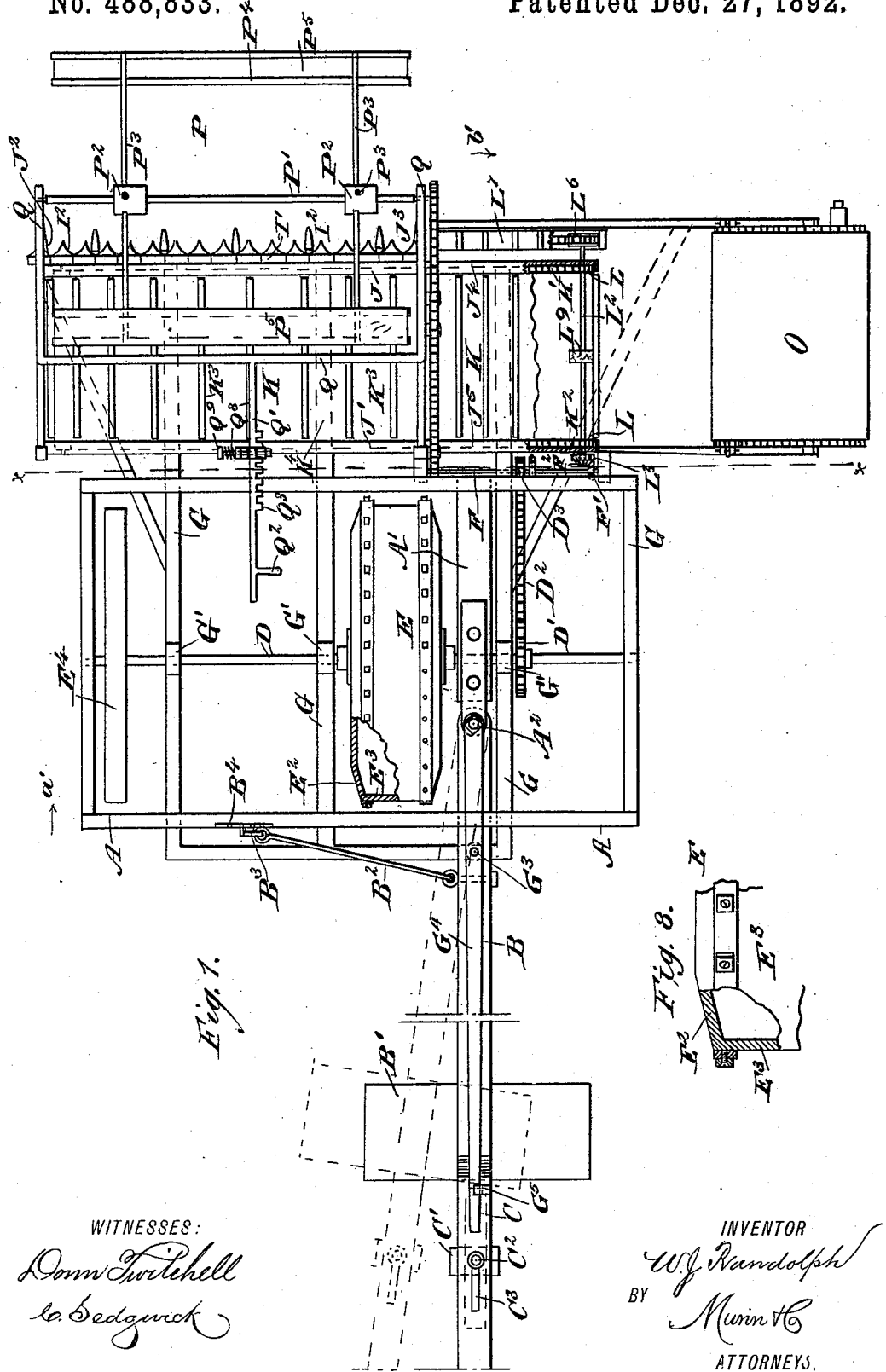

(No Model.) 3 Sheets—Sheet 1.

W. J. RANDOLPH.
GRAIN HARVESTING MACHINE.

No. 488,833. Patented Dec. 27, 1892.

WITNESSES:
Donn Twitchell
C. Sedgwick

INVENTOR
W. J. Randolph
BY
Munn & Co
ATTORNEYS.

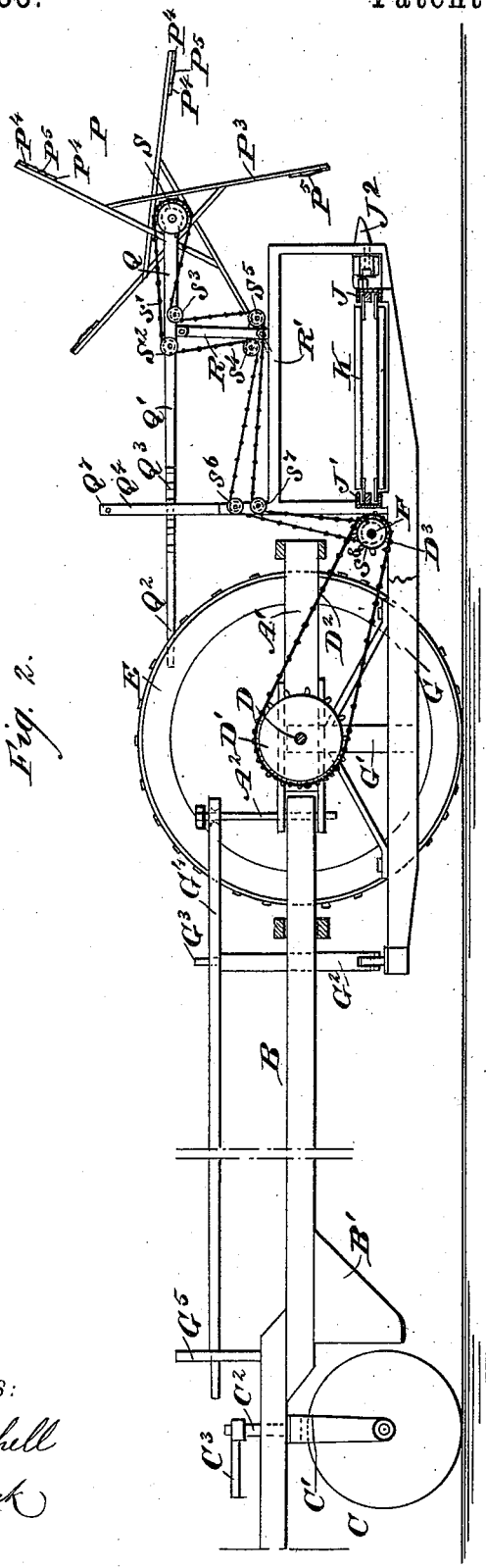

(No Model.) 3 Sheets—Sheet 3.
W. J. RANDOLPH.
GRAIN HARVESTING MACHINE.
No. 488,833. Patented Dec. 27, 1892.
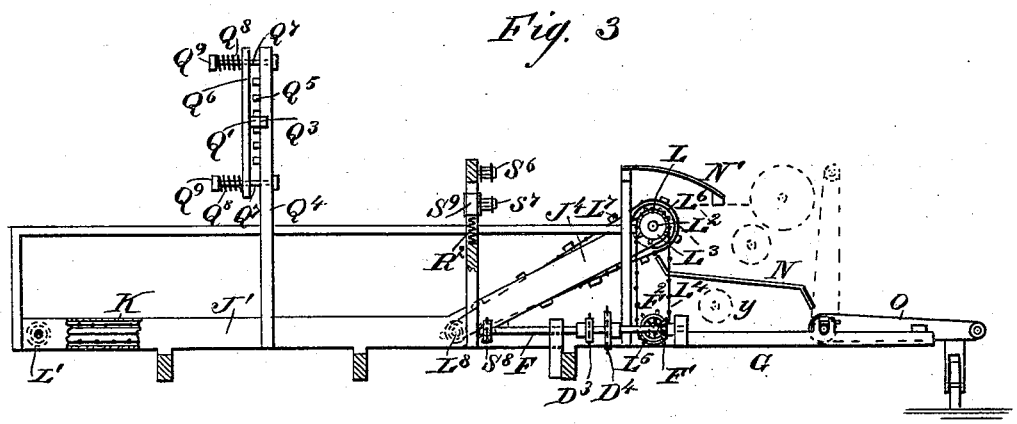
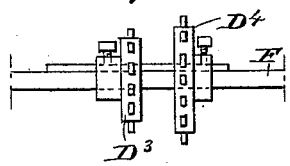
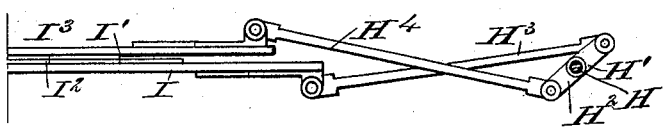
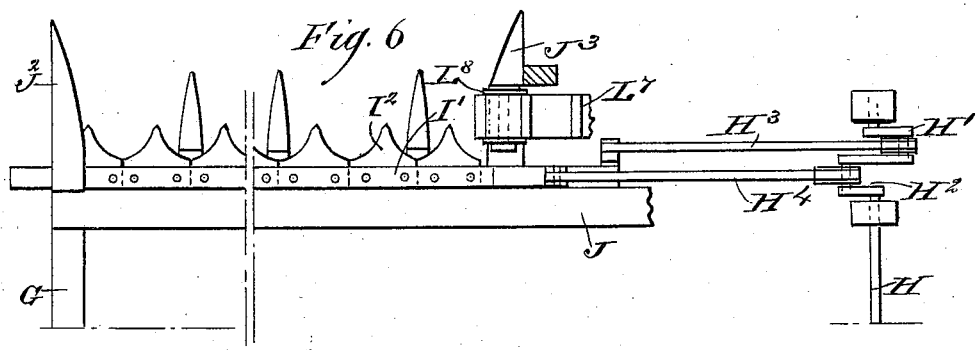
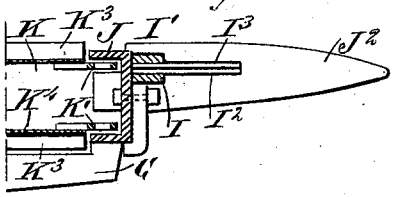
WITNESSES:
INVENTOR
ATTORNEYS.

UNITED STATES PATENT OFFICE.

WILLIAM J. RANDOLPH, OF MILLERSVILLE, LOUISIANA.

GRAIN-HARVESTING MACHINE.

SPECIFICATION forming part of Letters Patent No. 488,833, dated December 27, 1892.

Application filed December 16, 1891. Serial No. 415,218. (No model.)

*To all whom it may concern:*

Be it known that I, WILLIAM J. RANDOLPH, of Millersville, in the parish of Acadia and State of Louisiana, have invented a new and Improved Grain-Harvesting Machine, of which the following is a full, clear, and exact description.

The object of the invention is to provide a new and improved grain harvesting machine which is simple and durable in construction, very effective in operation and adapted for harvesting grain of any description, being however, specially designed for use in rice fields to harvest rice.

The invention consists of certain parts and details and combinations of the same, as will be hereinafter fully described and then pointed out in the claims.

Reference is to be had to the accompanying drawings forming a part of this specification, in which similar letters of reference indicate corresponding parts in all the figures.

Figure 1 is a plan view of the improvement with parts in section; Fig. 2 is a side elevation of the same with parts in section; Fig. 3 is a transverse section of the same on the line $x$—$x$ of Fig. 2; Fig. 4 is an enlarged end elevation of the adjustable transmitting sprocket wheels and shafts; Fig. 5 is a side elevation of the cutting mechanism; Fig. 6 is a plan view of the same; and Fig. 7 is an enlarged transverse section of the same. Fig. 8 is a detail view.

The improved grain harvesting machine is provided with a suitably-constructed main frame A, formed on one of its longitudinal beams A' with a pivot pin $A^2$ on which is fulcrumed the tongue B on which the animals for pushing the machine forward are hitched. The tongue B is formed with a seat B' in the rear of which is arranged a steering or guiding wheel C journaled in a fork C' provided with a pivot $C^2$ mounted to turn in the tongue B. The upper end of the pivot $C^2$ carries a handle $C^3$ under the control of the operator for turning the fork C' and the wheel C so as to steer the machine in the proper direction.

In the main frame A is journaled in suitable bearings, the transversely-extending main shaft D carrying the main driving wheel E made hollow and closed on all sides, as plainly illustrated in Fig. 1. The rim $E^3$ of this main driving wheel is made sufficiently wide to travel conveniently in the marshy ground of the rice field, the adherence of the wet ground being prevented by slightly beveling the edges $E^2$ of the sides the said edges being connected with the rim $E^3$. The rim is made sufficiently wide and wheel high so that sufficient friction exists between the rim and ground to revolve the wheel and the main driving shaft D, to impart the necessary motion to the working parts of the harvesting machine. Around this wheel are two iron tires, two and one-half inches wide and in these tires are threaded holes, to which lugs may be fastened by bolts in case the wheels should slip on the ground in developing power sufficient to drive the machine.

On the end of the main driving shaft D next to the grain side of the machine is secured a supporting wheel $E^4$ to ease the forward movement of the machine in the field. On the main driving shaft D is secured a sprocket wheel D', over which passes a sprocket chain $D^2$ also passing over either the sprocket wheel $D^3$ or $D^4$, made of different diameters, and held adjustably on the shaft F journaled in suitable bearings secured on a frame G supported by arms G' from the main driving shaft D, the said arms being loosely connected to the said shaft. By connecting the sprocket wheel $D^2$ with either the small or large sprocket wheel $D^3$ or $D^4$, a faster or slower speed is imparted to the shaft F from the main driving shaft D. The frame G is pivoted by the arms G' so that it can be readily swung up or down at its front end for the purpose hereinafter more fully described, without changing the distance from shaft D to shaft F.

On the rear end of the auxiliary frame G rests a roller journaled in the lower end of a link $G^2$ extending upward, the upper end of the said link carrying a pin $G^3$ engaged by a longitudinally-extending rod $G^4$ pivoted on the pivot pin $A^2$ previously mentioned. The rear or free end of the rod $G^4$ is adapted to be engaged by a notched post $G^5$, secured on the tongue B and serving to hold the frame G in the proper position after being adjusted. By pressing on the free end of the rod $G^4$, the link $G^2$ is caused to move downward, so that the auxiliary frame G is caused to swing, the front end rising from the ground. By moving the free end of the rod G⁴ upward, a reverse motion of the frame G takes place so that the front end of the frame swings toward the ground. The lower end of the link is provided with the roller resting upon frame G, so that when the machine is thrown around, the roller moves to the left on frame G and lever G⁴ remains in line with tongue B, still holding frame F, in position.

Near the outer end of the shaft F is secured a bevel gear wheel F′ in mesh with a bevel gear wheel F² secured on a shaft H extending longitudinally and mounted to turn in suitable bearings on the upper side of the frame G.

On the front end of the shaft H, see Figs. 5 and 6, are formed the two crank arms H′ and H² arranged diametrically opposite each other, and connected by the pitmen H³ and H⁴ respectively, with the sickle bars I and I′ respectively, mounted to slide transversely, one above the other, the lower sickle bar I being provided on its top with knives I² and the top sickle bar I′ being provided on its under side with knives I³ fitted to slide directly over the knives I², so that the cutting edges of the knives, by passing one over the other, shear the stalks of the grain. The back edges of the sickle bars I and I′ abut against the middle part of a U-shaped beam J extending transversely, and supported on the outer end of the auxiliary frame G. A similar beam J′ is arranged opposite the beam J, and forms with the latter guideways for the chains K′ and K² of an endless belt K traveling in the rear of the knives and sickle bars to carry the grain sidewise and upward, as hereinafter more fully described, the said belt being both carrier and elevator belt. From the outer end of the beam J extends forwardly a guard J² in which is guarded the outer ends of the sickle bars I and I′. A similar guard J³ is bolted or otherwise fastened to the inner end of the beam J, as plainly shown in Fig. 6, and at intermediate points about nine inches apart are placed sickle guards to prevent the sickles springing apart or doubling.

It is understood that when the machine is pushed forward in the direction of the arrow a′, the main driving wheel E imparts a rotary motion to the shaft D which latter, by the spocket wheels D′, D³ or D⁴ and sprocket chain D² imparts a rotary motion to the shaft F which latter by the bevel gear wheels F′ and F² imparts a rotary motion to the shaft H, and the latter by the crank arms H′ and H² causes the sickle bars I and I′ to reciprocate so that their knives I² and I³ pass over each other, so as to shear the stalk of the grain. The grain thus cut falls onto the endless belt K, which carries the grain to one side and upward. The carrier and elevator belt K is provided, besides the chains K′ and K², with slats K³ arranged parallel with each other and located suitable distances apart. The ends of the slats are secured in links of the said chains and the inner or opposite sides of the said slats carry canvas K⁴ tacked or otherwise fastened to the slats but slack so as to form pockets between the same and to prevent the canvas from getting as short or tight as chains K′ and K² when wet.

In order to form an elevator belt of the belt K, the ends of the beams J and J′ are bent upward at J⁴, as plainly shown in Fig. 3. The chains K′ and K² traveling in the said beams pass over sets of sprocket wheels L and L′ of which the sprocket wheels L are arranged in the upper ends of the beams J and J′, and the other sprocket wheels L′ are journaled in the grain side of the said beams, as plainly shown in Fig. 3. The sprocket wheels L are secured on a longitudinally-extending shaft L² mounted to turn in suitable bearings in the middle parts of the beams J and J′.

On the rear end of the shaft L² is secured a sprocket wheel L³ over which passes a sprocket chain L⁴ also passing over a sprocket wheel L⁵ secured on the shaft H previously mentioned. On the front end of the shaft L² is secured a sprocket wheel L⁶, somewhat larger in diameter than the sprocket wheels L over which passes a slat belt L⁷ also passing over a sprocket wheel L⁸ journaled in a suitable bracket attached to the beam J at the junction of the horizontal part of the said beam with its inclined arm J⁴, as plainly shown in Fig. 3. The chain L⁴ may also pass over sprocket wheels on driving shaft of binder to actuate the latter. The belt L⁷ is similarly constructed to the carrier belt K and serves to carry the butt end of the grain, the upper part of the said belt traveling somewhat faster than the belt K so that the butts are thrown over before the heads of the grain leave the carrier belt K, to prevent injury to the heads of the grain, and also to bring grain square with the binder.

At the rear of the carrier belt K is arranged the binding table N onto which the grain is discharged, the said binding table forming part of a binding mechanism of any approved construction. The grain is directed to the table N by the guide N′, mounted above the table and over the upper or delivery end of the belt K. The sheaf when bound by the binding mechanism is discharged on an endless belt O extending to one side and discharging the bound sheaf onto the ground alongside the machine. The table N is almost horizontal so that the grain cannot slide past the binder to be thrown out as scatterings.

In order to hold the carrier belt K in proper position, the shaft L² is provided with one or more pulleys L⁹ covered with rough sheep skin or other like material, so that the canvas K⁴ in passing over the said pulley prevents the belt from assuming an inclined position.

Over the cutting mechanism is arranged a reel P provided with a transversely-extending shaft P′ having a number of hubs P² from which extend the arms P³, each set carrying on its outer end transversely-extending bars P$^4$ on which is attached a strip of canvas P$^5$, or other suitable material, to conveniently gather in the rice without breaking the heads of the same when the reel is revolved. The inner ends of the arms P$^3$ extend beyond the respective hub P$^2$ onto the second following arm so as to brace the same, see Fig. 2. The shaft P' of the reel P is journaled in the outer ends of a U-shaped arm Q pivoted on links R pivotally-connected with a frame R' supported on top of the auxiliary frame G. The U-shaped arm Q is provided with a handled end Q' extending rearwardly and having a handle Q$^2$ under the control of the operator, so as to move the arm Q and consequently the reel P forward or backward, or downward or upward, as desired, and according to the condition of the grain to be cut.

On the handled end Q' is formed a series of teeth Q$^3$ adapted to engage an upright post Q$^4$ projecting from the frame G. The teeth Q$^3$ are adapted to interlock with corresponding teeth Q$^5$ arranged on one side of the post Q$^4$, as plainly illustrated in Fig. 3, so that the handle end Q' may be moved forward or backward or up and down and locked in position on the post Q$^4$ according to the position desired for the reel P.

In order to hold the handled end Q' in place when adjusted to the proper position on the post Q$^4$, a plate Q$^6$ is provided pressing on the back of the handled end Q' and mounted to slide on pins Q$^7$ projecting transversely from the post Q$^4$. The plate Q$^6$ is pressed on by springs Q$^8$ abutting against heads Q$^9$ formed on the rear ends of the said pins Q$^7$. By the operator taking hold of the handle Q$^2$ and moving the handled end Q' to the grain side of the machine, the plate Q$^6$ is pressed in a like direction, so that the teeth Q$^3$ are disengaged from the teeth Q$^5$ and the operator is enabled to move the handled end Q' forward or backward, or up and down so as to adjust the reel P to the proper position. As soon as the operator releases his pressure on the handled end Q', the spring pressed plate Q$^6$ locks the interlocking teeth Q$^3$ and Q$^5$ so as to prevent movement of the handled end and consequent movement of the frame Q carrying the reel P.

It is understood that the reel arm Q is free to swing up and down, the upper end of the links R forming the fulcrum and it is also free to swing forward and backward, the pivoted lower ends of the said links being the fulcrum. The reel P is driven from the shaft F and for this purpose, the shaft P' of the reel is provided with a sprocket wheel S, over which passes an endless sprocket chain S' also passing over two idlers S$^2$ and S$^3$ journaled on the reel arm Q at opposite sides of the fulcrum of the links R. The sprocket chain S' extends from the idlers S$^2$ and S$^3$ under the sprocket wheels S$^4$ and S$^5$ journaled at the lower pivoted end of one of the links R, the chain then extending rearward over idlers S$^6$ and S$^7$ and then downward under a sprocket wheel S$^8$ secured on the shaft F. The idler S$^6$ is journaled in the frame R' and the idler S$^7$ is journaled in a bearing S$^9$ fitted to slide in the frame R' and resting on a coiled spring R$^2$, as plainly shown in Fig. 3. By this arrangement the chain S' is held taut no matter what position the arm Q is moved to, so that the transmission of power from the shaft F to the reel P is not affected when changing the position of the arm Q and reel P in the manner above described.

The operation is as follows: When the machine is pushed forward by the team attached to the tongue B then a reciprocating motion is imparted to the sickle bars I and I' by the mechanism and in the manner above described. At the same time the carrier and elevator belt K receive a traveling motion and the reel P is rotated so as to push the grain rearward to hold the same in proper position for the knives I$^2$ and I$^3$ to cut the stalks. The reel also forces the cut grain onto the carrier belt K which, traveling in the direction of the arrow $b'$ moves the grain first sidewise and then upward and discharges the same onto the binding table N. The butt ends of the stalks are carried by the belt L$^7$ in the manner above described to prevent injury to the heads of the grain at the time the latter is delivered from the elevator belt onto the binding table N; and to deliver grain square with binder. As the auxiliary frame G carrying the cutting mechanism and the reel P as well as the elevator and carrier belt K can be raised or lowered at the front end the machine can be readily adapted for cutting high or low grain. As the reel P is separately adjustable, it can be readily placed in the proper position according to the height or condition of the corn to be cut. The tongue B when in the ordinary position while the machine is working, extends longitudinally and at right angles to the frames A and G. In order to hold the tongue in this position a link B$^2$ is attached to the lower end of a lever B$^3$ reaching above frame A, so that the operator on the frame A may seize the same, lift the latch held on lever B$^3$ from the notched plate B$^4$ and throw lever over and thus place push bar or tongue as described. The fulcrum of said lever B$^3$ is in frame A, and its short end extends below the frame A and is attached to link B$^2$. When the machine is moved around a curve the device B$^3$ is unfastened from the notched bar B$^4$ so that the tongue can be swung into an angular position, as shown in dotted lines in Fig. 1, the link B$^2$ then again being fastened to the notched bar B$^4$ on the frame A. The team now pushing on the tongue B moves the machine in the arc of a circle thus conveniently passing around the curve in the road or path.

It is understood that by arranging the cutting mechanism and binding table in front of the main drive wheel, the grain need not be elevated over the latter in order to carry it from the cutting mechanism to the binding table, and in consequence of which the drive wheel can be made very large in diameter and also in width, to readily pass over soft ground as is the case if the machine is used for harvesting rice and other grain grown in submerged fields.

Having thus fully described my invention, I claim as new, and desire to secure by Letters Patent,—

1. In a harvester, the main drive wheel formed with closed sides, and a flat closed rim parallel with the axis of the wheel and having beveled edges, substantially as set forth.

2. In a harvester, the main drive wheel formed with closed sides, a flat closed rim parallel with the axis of the wheel, having beveled edges and encircling tires provided with threaded apertures, bolts entering said apertures and lugs held in place by the bolts, substantially as set forth.

3. In a harvesting machine, the combination with a reel, of a reel frame in which the said reel is journaled, a handle end projecting from the said frame, vertically arranged links pivotally-connected with the said reel frame to support the same and permitting a swinging and a forward and backward motion of the same, a toothed post adapted to be engaged by teeth on the said handle end, and provided on its toothed side with transverse pins and a spring pressed plate mounted loosely on said pins parallel with the said post and pressing on the said handle end, and movable outward by said handle substantially as shown and described.

4. In a harvesting machine, the combination with two beams made U-shaped in cross section and having part inclined upwardly, of sprocket wheels journaled in the ends of the said beams, sprocket chains passing over the said sprocket wheels and along the inside of the beams, slats secured to the sprocket chains and canvas attached to the inside of the slats, substantially as shown and described.

5. In a harvesting machine, the combination with two beams made U-shaped in cross section and having part inclined upwardly, of sprocket wheels journaled in the ends of the said beams, sprocket chains passing over the said sprocket wheels and along the inside of the beams, slats secured to the sprocket chains, canvas attached to the inside of the slats, and a covered pulley held on the shaft of the uppermost set of sprocket wheels, and around which covered pulley passes the said canvas, substantially as shown and described.

6. The combination with the two beams U-shape in cross section, and the guards projecting from the outer face of the forward beam, and the sickle bars reciprocating oppositely in said guards, of the endless carrier, the edges of which travel within the adjacent open sides of said two beams, substantially as set forth.

WILLIAM J. RANDOLPH.

Witnesses:
E. N. MARSH,
L. E. BELLOME.